United States Patent
Miura et al.

(10) Patent No.: US 12,333,190 B2
(45) Date of Patent: Jun. 17, 2025

(54) MEMORY SYSTEM AND INFORMATION PROCESSING SYSTEM

(71) Applicant: Kioxia Corporation, Tokyo (JP)

(72) Inventors: Hiroki Miura, Yokohama Kanagawa (JP); Naoto Oshiyama, Ota Tokyo (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/457,252

(22) Filed: Aug. 28, 2023

(65) Prior Publication Data

US 2024/0329882 A1 Oct. 3, 2024

(30) Foreign Application Priority Data

Mar. 29, 2023 (JP) ................. 2023-052512

(51) Int. Cl.
*G06F 3/06* (2006.01)

(52) U.S. Cl.
CPC .......... *G06F 3/0659* (2013.01); *G06F 3/0656* (2013.01); *G06F 3/0622* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2013/0024606 A1* | 1/2013 | Suzuki | G11C 16/0483 711/E12.008 |
| 2019/0034105 A1 | 1/2019 | Natarajan et al. | |
| 2020/0034067 A1 | 1/2020 | Yamamoto et al. | |
| 2021/0181975 A1* | 6/2021 | Bhoopali | G06F 3/0649 |

FOREIGN PATENT DOCUMENTS

JP 2012-164072 A 8/2012

* cited by examiner

*Primary Examiner* — Charles J Choi
(74) *Attorney, Agent, or Firm* — Kim & Stewart LLP (57) ABSTRACT

A memory system is connectable to a host and includes a nonvolatile memory including a plurality of memory cells, a data buffer connected to the nonvolatile memory, and a memory controller configured to control the nonvolatile memory and including a tag recognition circuit. The tag recognition circuit is configured to recognize whether a storage state tag is assigned to first data in the data buffer, wherein the storage state tag indicates a mode of writing the first data in the memory cells.

15 Claims, 5 Drawing Sheets

ACCESS FREQUENCY TABLE

| LBA RANGE | ACCESS FREQUENCY |
|---|---|
| STARTING LBA, ENDING LBA | 10 |
| STARTING LBA, ENDING LBA | 20 |
| ⋮ | ⋮ |

FIG. 10

LOW FREQUENCY ACCESS RATIO TABLE

| BLOCK NUMBER | HIGH FREQUENCY ACCESS VALID DATA AMOUNT | LOW FREQUENCY ACCESS VALID DATA AMOUNT | LOW FREQUENCY ACCESS RATIO (%) |
|---|---|---|---|
| 1 | 50 | 50 | 50 |
| 2 | 70 | 30 | 30 |
| 3 | 20 | 80 | 80 |
| ⋮ | ⋮ | ⋮ | ⋮ |

MEMORY SYSTEM AND INFORMATION PROCESSING SYSTEM

CROSS-REFERENCE TO RELATED APPLICATION

This application is based upon and claims the benefit of priority from Japanese Patent Application No. 2023-052512, filed Mar. 29, 2023, the entire contents of which are incorporated herein by reference.

FIELD

Embodiments described herein relate generally to a memory system and an information processing system.

BACKGROUND

A solid state drive (SSD) including a nonvolatile memory is one type of known storage devices. The SSD writes data received from a host device (hereinafter referred to as a host) into a memory cell of the nonvolatile memory.

An SSD may have a first write mode that gives priority to write speed and a second write mode that gives priority to write capacity. Such an SSD may change the write mode according to a remaining SSD memory capacity.

DETAILED DESCRIPTION

Embodiments provide a memory system and an information processing system that can increase the lifetime of a memory cell.

In general, according to one embodiment, there is provided a memory system that is connectable to a host and includes a nonvolatile memory including a plurality of memory cells, a data buffer connected to the nonvolatile memory, and a memory controller configured to control the nonvolatile memory, the memory controller including a tag recognition circuit. The tag recognition circuit is configured to recognize whether a storage state tag is assigned to first data in the data buffer, wherein the storage state tag indicates a mode of writing the first data in the memory cells.

The following description exemplifies apparatuses and methods for embodying technical ideas of embodiments, and the technical ideas of the embodiments are not limited to the structure, shape, arrangement, material, and the like of components described below. Modifications that can be easily conceived of by those skilled in the art are naturally come within the scope of the disclosure. In order to make the description clearer, in the drawings, the size, thickness, planar dimension, shape, and the like of each element may be changed from actual ones and schematically represented. In a plurality of drawings, elements having different dimensional relationships and ratios to each other may be included. In the plurality of drawings, corresponding elements are denoted by the same reference numerals, and duplicate descriptions thereof may be omitted. Although some elements may be given a plurality of names, these examples of names are merely examples, and these elements may be called by other names. In addition, other names may be given to elements that are not given the plurality of names. In the following description, "connection" means not only direct connection but also indirect connection via another element.

Hereinafter, embodiments for embodying the disclosure will be described with reference to the drawings.

Figure 1:
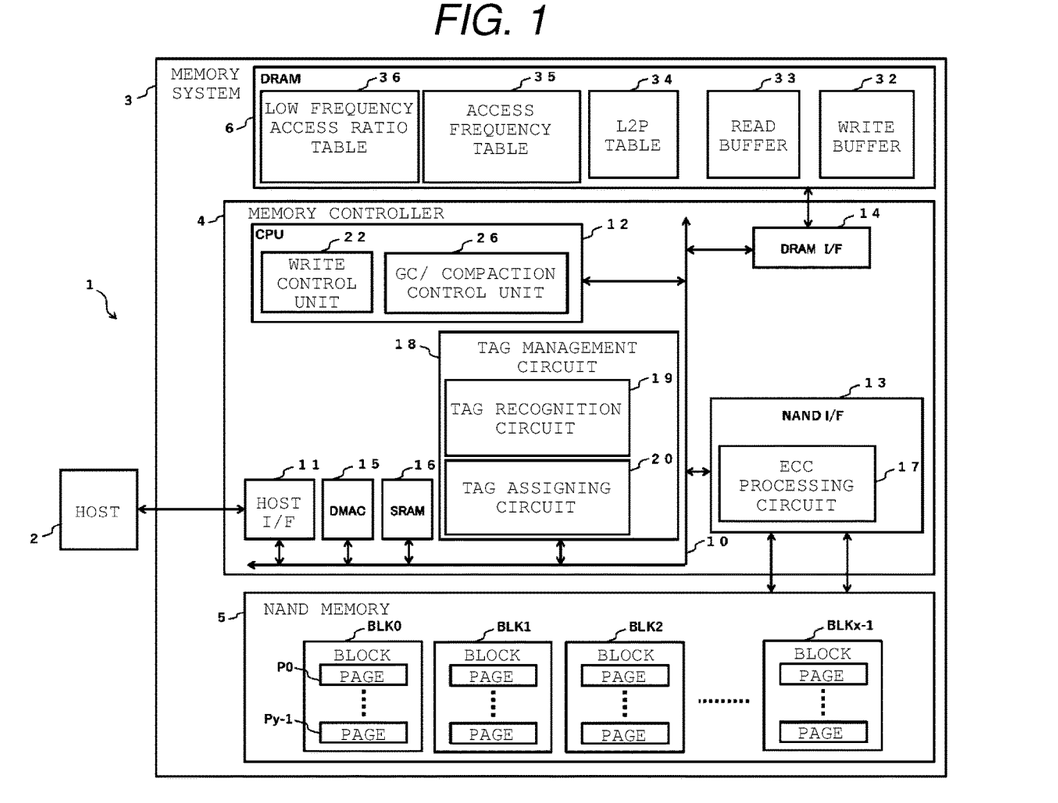
FIG. 1 is a block diagram illustrating a configuration example of a memory system according to an embodiment.

A configuration of an information processing system 1 including a storage device according to an embodiment will be described. FIG. 1 is a block diagram illustrating a configuration example of the information processing system 1 including the storage device according to the embodiment. The storage device is a semiconductor storage device configured to write data into and read data from a nonvolatile memory. An example of the storage device includes, but is not limited to, an SSD. An example of the nonvolatile memory includes, but is not limited to, a NAND flash memory. Hereinafter, the nonvolatile memory is referred to as a NAND memory. Here, the semiconductor storage device is a memory system 3 including a NAND memory 5.

The information processing system 1 includes a host 2 and the memory system 3. The host 2 is an information processing device configured to control the memory system 3. Examples of the host 2 include a personal computer, a server computer, a mobile terminal, and in-vehicle equipment.

Here, an example in which the memory system 3 is connected to the host 2 via a cable or a network will be described, but the memory system 3 may be built into the host 2.

Interfaces for connecting the host 2 and the memory system 3 may include, but are not limited to, serial ATA (SATA), serial attached SCSI (SAS), universal flash storage (UFS), PCI Express® (PCIe), and Ethernet®.

The memory system 3 includes a memory controller 4, the NAND memory 5, and a dynamic random access memory (DRAM) 6.

The NAND memory 5 includes a plurality of memory cells arranged in a matrix. The NAND memory 5 may be a two-dimensional flash memory or a three-dimensional flash memory. The NAND memory 5 may include a plurality of NAND memory chips (that is, a plurality of NAND memory dies). Each chip may be implemented as a flash memory configured to be able to store 1-bit or a plurality of bits of data per memory cell.

The flash memory configured to be able to store 1-bit data per memory cell is referred to as a single-level cell (SLC) flash memory. Examples of flash memories configured to be able to store the plurality of bits of data per memory cell include a multi-level cell (MLC or 4LC) flash memory that can store 2-bit data per memory cell, a triple-level cell (TLC, or 8LC) flash memory that can store 3-bit data per memory cell, a quad-level cell (QLC, or 16LC) flash memory that can store 4-bit data per memory cell, a flash memory that can store 5-bit or more data per memory cell, and the like.

A memory cell array of the NAND memory 5 includes a plurality of blocks BLK0 to BLKx-1. Each of the blocks BLK0 to BLKx-1 includes a plurality of pages P0 to Py-1. Each of the pages P0 to Py-1 includes the plurality of memory cells connected to the same word line. Each of the blocks BLK0 to BLKx-1 is a unit of data erasing operation for erasing data from the NAND memory 5. A block may also be referred to as an "erase block", "physical block," or "physical erase block". A page is a unit of data writing and data reading. A word line may define a unit of data writing and data reading.

There is a limit to the maximum allowable number of program/erase cycles for each of the blocks BLK0 to BLKx-1. One program/erase cycle for a block includes an erasing operation to put all memory cells in the block into an erased state and a write operation to write data into each page of the block (more specifically, program operation).

In each block, each page may include a user data area for storing user data and a system area for storing management data. The user data area is an area used for writing and reading data received from the host 2. The management data is, for example, data indicating whether each piece of data in the block is valid data or invalid data in units of a predetermined management size (for example, 4 KB).

The page size is 16 KB plus alpha. The memory controller 4 writes both user data of 4 KB and a logical address (for example, LBA) corresponding to this user data of 4 KB into a write destination block BLK. In this case, four data sets, each containing the LBA and the user data of 4 KB, may be written into the same page. Alternatively, four pieces of the user data of 4 KB may be written in the user data area in the page, and four LBAs corresponding to these four user data of 4 KB may be written in the system area in this page.

The memory controller 4 may be implemented by a circuit such as a system-on-a-chip (SoC). The memory controller 4 is electrically connected to the NAND memory 5 via a NAND interface (I/F) 13. The NAND I/F 13 conforms to, but is not limited to, a Toggle NAND flash interface and an open NAND flash interface (ONFI). The NAND I/F 13 is connected to each of the plurality of NAND memory chips in the NAND memory 5 via a plurality of channels (Ch). By driving the plurality of NAND memory chips in parallel, access to the NAND memory 5 can be made at higher speeds. The NAND I/F 13 includes an ECC processing circuit 17. Here, an example in which the ECC processing circuit 17 is provided in the NAND I/F 13 will be described, but the ECC processing circuit 17 may be provided in the memory controller 4.

The ECC processing circuit 17 may be implemented as a circuit having a function of protecting data to be written into the NAND memory 5 and data read from the NAND memory 5 with an error correction code (ECC). The ECC processing circuit 17 adds the ECC to the data to be written into the NAND memory 5. The ECC processing circuit 17 uses the ECC added to the data read from the NAND memory 5 to determine whether an error occurs in the read data, and corrects the error when the error occurs.

The memory controller 4 controls the NAND memory 5.

In addition to the NAND I/F 13 described above, the memory controller 4 includes a host interface (I/F) 11, a CPU 12, a DRAM interface (I/F) 14, a direct memory access controller (DMAC) 15, a static RAM (SRAM) 16. The host I/F 11, CPU 12, NAND I/F 13, DRAM I/F 14, DMAC 15, and SRAM 16 are connected to each other via a bus 10.

The host I/F 11 is a host interface circuit configured to execute communication with the host 2. The host I/F 11 is, for example, a SATA interface controller, a SAS interface controller, a PCIe controller, an Ethernet controller, and the like.

The host I/F 11 receives various commands from the host 2. The SATA interface uses an ATA command defined in the ATA standard, the SAS interface uses an SCSI command defined in the SCSI standard, and the PCIe interface and the Ethernet interface use an NVM Express (NVMe®) command defined in the NVMe standard.

The CPU 12 is a processor configured to control the host I/F 11, the NAND I/F 13, and the DRAM interface 14. The CPU 12 performs various processes by executing a control program (firmware) stored in a ROM (not illustrated) or the like. In the embodiments, the CPU 12 is programmed to function as a write control unit 22 and a garbage collection (hereinafter referred to as GC)/compaction control unit 26.

The memory system 3 includes the DRAM 6 as a random access memory (RAM) which is a volatile memory. Here, the case where the memory system 3 is provided with the DRAM 6 will be described, but a random access memory such as a static random access memory (SRAM) may be embedded into the memory controller 4. The DRAM 6 may be embedded into the memory controller 4.

The random access memory such as the DRAM 6 is provided with, for example, cache areas of a write buffer 32 and a read buffer 33 as data buffers. Furthermore, the random access memory such as the DRAM 6 may be provided with storage areas for various values used during the process and various tables (lookup table 34, access frequency table 35, low frequency access ratio table 36, and the like).

Various tables stored in the DRAM 6 are loaded from the NAND memory 5 into the DRAM 6 when the power of the memory system 3 is turned on or the like. The various tables may be loaded after an initialization process of the memory system 3 is completed. The memory controller 4 performs the process using the various tables loaded into the DRAM 6. The memory controller 4 writes the various tables into the NAND memory 5 at a predetermined timing (every certain period, when a standby command is received, when a flush command is received, or when the power is off) and updates the various tables stored in the NAND memory 5.

The write buffer 32 is a place where write data is temporarily stored. A specific operation regarding the write buffer 32 will be described. When receiving a data write command from the host 2, the memory controller 4 temporarily stores data to be written in the write buffer 32. The memory controller 4 writes the data in the write buffer 32 into a location in the NAND memory 5 correlated with a designated address.

The read buffer 33 is a place where read data is temporarily stored. A specific operation regarding the read buffer 33 will be described. When receiving a data read command from the host 2, the memory controller 4 reads data from a location in the NAND memory 5 correlated with a designated address. The memory controller 4 temporarily stores the read data in the read buffer 33 and sends the data stored in the read buffer 33 to the host 2.

The lookup (L2P) table 34 functions as a logical-to-physical address conversion table. A logical address is an address used by the host 2 to address a logical address in a logical address space of the memory system 3. As the logical address, a logical block address (LBA) may be used. The L2P table 34 manages mapping between each of the logical addresses (hereinafter referred to as LBAs) and each of physical block addresses (PBAs) of the NAND memory 5.

Figure 9:
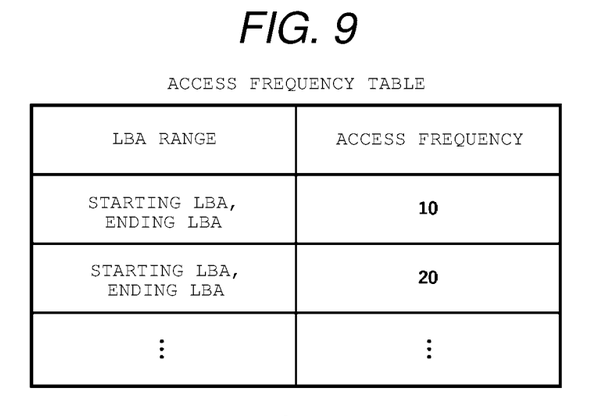
FIG. 9 is a diagram illustrating a configuration example of an access frequency table used in the memory system according to the embodiment.

The access frequency table 35 manages access frequency for each LBA range, as illustrated in FIG. 9. Each LBA range may be defined by a starting LBA and an ending LBA, or may be defined by the starting LBA and a size.

Figure 10:
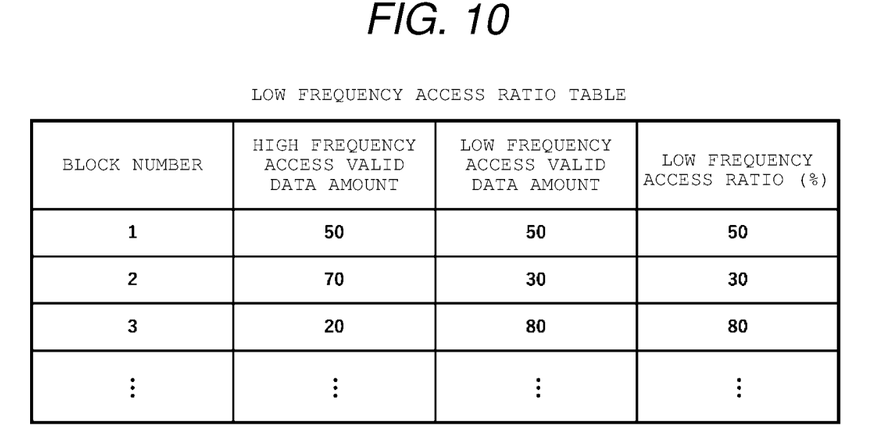
FIG. 10 is a diagram illustrating a configuration example of a low frequency access ratio table used in the memory system according to the embodiment.

As illustrated in FIG. 10, the low frequency access ratio table 36 manages a low frequency access ratio for each block. The low frequency access ratio is a ratio of low frequency access valid data in a block to all valid data in that block. The low frequency access ratio table 36 includes, for example, a block number, a high frequency access valid data amount, a low frequency access valid data amount, and a low frequency access ratio. The high frequency access valid data amount and the low frequency access valid data amount increase or decrease according to the update of the L2P table 34 and the access frequency table 35 and according to the change in the access frequency for each LBA in the LBA range. The low frequency access ratio is calculated using the high frequency access valid data amount and the low frequency access valid data amount, and also may be expressed, for example, as a percentage.

The memory controller 4 can function as a flash translation layer (FTL) configured to execute data management and block management of the NAND memory 5.

The data management executed by the FTL includes (1) management of mapping information indicating the corresponding relation between each LBA and each physical address of the NAND memory 5 and (2) processing for concealing constraints of the NAND memory 5 (for example, read/write operations in page units and erasing operation in block units).

The memory controller 4 uses the L2P table 34 to manage the mapping between each LBA and each physical address. A physical address corresponding to a certain LBA indicates the most recent physical storage location in the NAND memory 5 into which data corresponding to this LBA is written.

When receiving a read request from the host 2, the memory controller 4 converts a logical address designated by the read request into a physical address using the address conversion table described above, and instructs the NAND I/F 13 to read from the physical address.

In the NAND memory 5, data can be written into a page only once per erase cycle (also referred to as a program/erase cycle) of the block containing that page. That is, new data cannot be directly overwritten into an area in a block in which data is already written. Therefore, when updating already written data, the memory controller 4 writes new data into an unwritten area in the block (or another block) and treats previous data as invalid data. In other words, the memory controller 4 writes update data corresponding to a certain LBA into another physical storage location rather than the physical storage location where the previous data corresponding to this LBA is stored. The memory controller 4 updates the L2P table 34 to associate the physical address indicating the other physical storage location with this LBA and invalidates the previous data.

Invalid data means data stored in a physical storage location that is not referenced from the L2P table 34. For example, the data stored in the physical storage location not referenced from the L2P table 34 (that is, data not associated with an LBA as the most recent data) is invalid data. Invalid data is data that is no longer likely to be read from the host 2. When update data is stored in a storage location of a new physical address associated with an LBA, valid data stored in the storage location of the new physical address is associated with that LBA until the update data becomes invalid data.

Valid data means the most recent data corresponding to an LBA. For example, data stored in the physical storage location referenced from the L2P table 34 (that is, data associated with the LBA as the most recent data) is valid data. Valid data is data that is likely to be read from the host 2 later.

The block management executed by the FTL includes defective block management, wear leveling processing, and GC processing.

The wear leveling processing is an operation for equalizing the number of times of rewriting in each block (the number of program/erase cycles).

The GC processing is an operation for reducing the number of blocks in which valid data and invalid data are mixed and increasing the number of free blocks. The free block means a block that does not contain valid data. The free block is a block that can be used as a new data write destination block after the data erasing operation is performed. On the other hand, a block containing valid data is an active block.

The NAND memory 5 can execute a write process in a plurality of write modes that differ depending on how many bits of data are written per memory cell. The write modes include, for example, a write mode in which 1-bit data is written per memory cell (hereinafter referred to as an SLC mode), a write mode in which 2-bit data is written per memory cell (hereinafter referred to as a MLC mode), a write mode in which 3-bit data is written per memory cell (hereinafter referred to as a TLC mode), a write mode in which 4-bit data is written per memory cell (hereinafter referred to as a QLC mode), a write mode in which 5-bit or more data is written per memory cell, and the like.

For example, the NAND memory 5 may be implemented as an MLC flash memory capable of storing 2-bit data per memory cell (that is, 4LC flash memory).

In this case, normally, lower page data and upper page data, which are two pages of data, are written into the plurality of memory cells connected to the same word line. With this configuration, 2-bit data can be written per memory cell. Any area in this MLC flash memory (for example, one or more freely selected blocks) can be used as an SLC area that can store only 1-bit data per memory cell.

In the write operation for writing data in the SLC area, only one page of data is written into the plurality of memory cells connected to the same word line. With this configuration, in each block used as the SLC area, like each block in the SLC flash memory (that is, SLC block), only 1-bit data can be written per memory cell. As a result, each block used as the SLC area functions as the SLC block.

Alternatively, the NAND memory 5 may be a TLC flash memory capable of storing 3-bit data per memory cell (8LC flash memory).

In this case, normally, lower page data, middle page data, and upper page data, which are three pages of data, are written into the plurality of memory cells connected to the same word line. With this configuration, 3-bit data can be written per memory cell. Any area (for example, one or more freely selected blocks) in this TLC flash memory may be used as the SLC area described above, or may be used as an MLC area capable of storing 2-bit data per memory cell. The SLC area and the MLC area may be set in units smaller than blocks (for example, a unit of word lines, a unit of a set of word lines in a block). In the MLC area, only two pages of data are written into the plurality of memory cells connected to the same word line. With this configuration, in the MLC area, only 2-bit data can be written per memory cell.

Alternatively, the NAND memory 5 may be a QLC flash memory capable of storing 4-bit data per memory cell (16LC flash memory).

In this case, normally, four pages of data are written into the plurality of memory cells connected to the same word line. With this configuration, 4-bit data can be written per memory cell. Any area in this QLC flash memory (for example, one or more freely selected blocks) may be used as the SLC area described above, may be used as the MLC area described above, or may be used as a TLC area capable of storing 3-bit data per memory cell. The SLC area, the MLC area, and the TLC area may be set in units smaller than blocks (for example, a unit of word lines, a unit of a set of word lines in a block). In the TLC area, only three pages of data are written into the plurality of memory cells connected to the same word line. With this configuration, 3-bit data can be written per memory cell in the TLC area.

A storage density per memory cell in each write mode is binary in the SLC mode (that is, one page per word line), quaternary in the MLC mode (that is, two pages per word line), octal in the TLC mode (that is, three pages per word line), and hexadecimal in the QLC mode (that is, four pages per word line). A data read speed and data write speed with respect to the NAND memory 5 are slower as the storage density is higher and faster as the storage density is lower. Therefore, of these four modes, the data read speed and data write speed in the QLC mode are the slowest and the data read speed and data write speed in the SLC mode are the fastest.

In addition, the lifetime (endurance) of the NAND memory 5 is shorter as the storage density is higher and longer as the storage density is lower. The lower the storage density, the wider the margin between threshold voltage distributions corresponding to adjacent states, and the higher the storage density, the narrower the margin between threshold voltage distributions. A wide margin prevents an increase in the probability that data in the memory cell is read as erroneous data even if a threshold voltage of the memory cell shifts due to stress applied to the memory cell.

Thus, for example, the individual degree of wear-out of memory cells that can be tolerated in the SLC mode is higher than the individual degree of wear-out of memory cells that can be tolerated in the QLC mode. Accordingly, the case of using a low storage density write mode having a wide margin between threshold voltage distributions can prolong the lifetime of the NAND memory 5 (i.e. increase the maximum allowable number of program/erase cycles) compared to the case of using a high storage density write mode having a narrow margin between threshold voltage distributions.

Of the four modes, the lifetime in the QLC mode becomes the shortest and the lifetime in the SLC mode becomes the longest. For example, the maximum allowable number of program/erase cycles when data is written in the QLC mode is several k cycles, and the maximum allowable number of program/erase cycles when data is written in the SLC mode is several tens of k cycles.

The NAND memory 5 may be configured to be able to store 5-bit or more data per memory cell. Also, in this case, any area in the NAND memory 5 may be used as an area in which only 4-bit or less data per memory cell is written.

An example of a storage capacity of the NAND memory 5 in accordance with each write mode will be described. Here, it is assumed that the plurality of NAND memory chips in the NAND memory 5 are implemented as QLC flash memories configured to be able to store 4-bit data per memory cell. It is also assumed that when data is written into the NAND memory 5 in the QLC mode, the storage capacity of the NAND memory 5 is 512 GB.

Under optimal conditions without the defective block or the like, the storage capacity of the NAND memory 5 when data is written in the TLC mode is 384 GB, the storage capacity of the NAND memory 5 when data is written in the MLC mode is 256 GB, and the storage capacity of the NAND memory 5 when data is written in the SLC mode is 128 GB.

As such, the storage capacity of the NAND memory 5 differs depending on which write mode data is written in.

In the embodiment, as the write mode of the NAND memory 5, first and second write modes in which the number of bits that can be stored in each memory cell are different can be selected. The first write mode is a write mode with priority given to performance for improving write performance (and read performance) of the memory system 3 in which the number of bits that can be stored per memory cell is small. Meanwhile, the second write mode is a write mode with priority given to capacity for increasing the storage capacity in which the number of bits that can be stored per memory cell is large. Examples of combinations of the first write mode and the second write mode when the NAND memory 5 has the SLC mode, the MLC mode, the TLC mode, and the QLC mode as the write mode are illustrated.

(1) In the first combination, the first write mode is the SLC mode and the second write mode is the MLC mode. (2) In the second combination, the first write mode is the SLC mode and the second write mode is the TLC mode. (3) In the third combination, the first write mode is the SLC mode and the second write mode is the QLC mode. (4) In the fourth combination, the first write mode is the MLC mode and the second write mode is the TLC mode. (5) In the fifth combination, the first write mode is the MLC mode and the second write mode is the QLC mode. (6) In the sixth combination, the first write mode is the TLC mode and the second write mode is the QLC mode.

In the following description, the write mode with priority given to performance is the SLC mode, and the write mode with priority given to capacity is the TLC mode.

In the embodiment, as will be described later, the memory controller 4 is configured to designate the write mode of the NAND memory 5.

An overview of the write process of the NAND memory 5 will be described. Here, as an example, the case where the SLC mode is used as the first write mode and the TLC mode is used as the second write mode is described. Each block of the NAND memory 5 can be used as a TLC block or the SLC block.

The write data sent from the host 2 to the memory system 3 is temporarily stored in the write buffer 32. The write data read from the write buffer 32 is written into the write destination block of the NAND memory 5.

Figure 2:
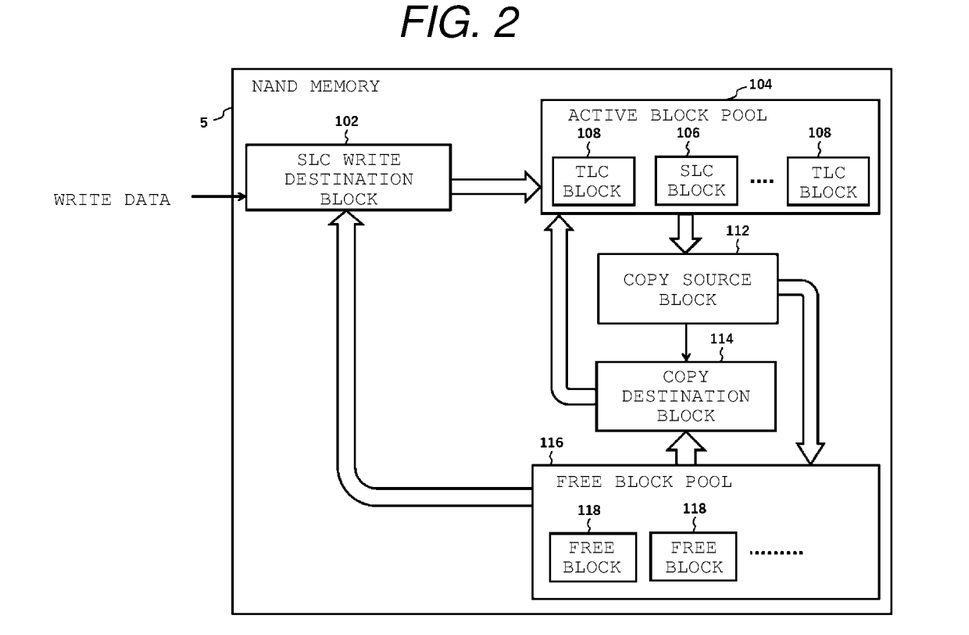
FIG. 2 is a diagram illustrating a configuration example of a NAND flash memory in the memory system according to the embodiment.

FIG. 2 illustrates an example of the write process when the write mode of the NAND memory 5 is set to the SLC mode. When the write mode is set to the SLC mode, the write data is written into an SLC write destination block 102. The SLC write destination block 102 is the SLC block.

Figure 3:
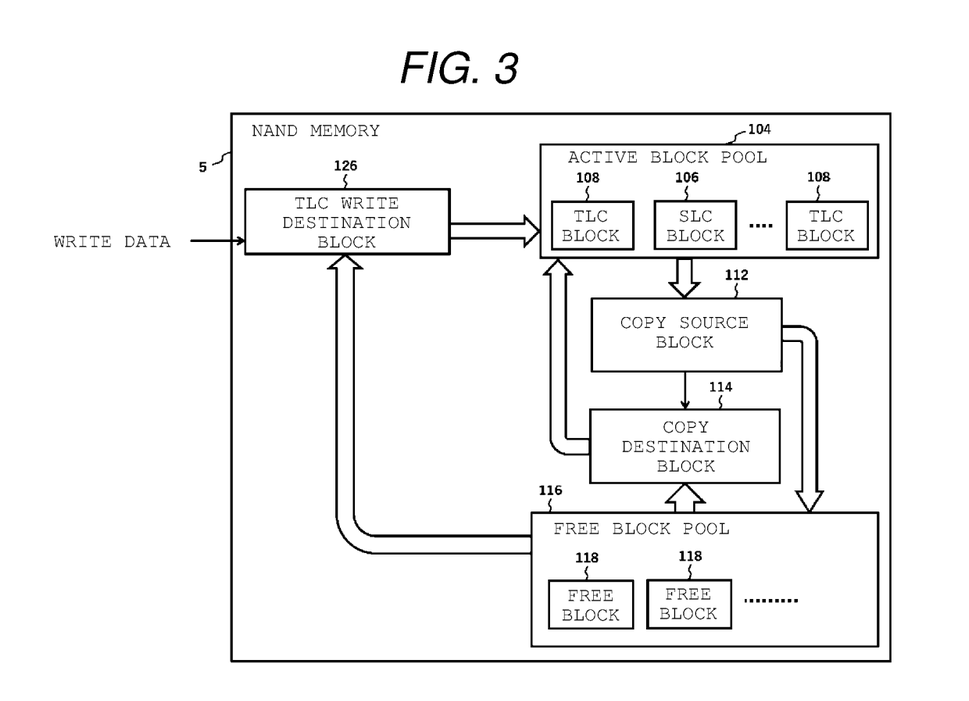
FIG. 3 is a diagram illustrating another configuration example of the NAND flash memory in the memory system according to the embodiment.

FIG. 3 illustrates an example of the write process when the write mode of the NAND memory 5 is set to the TLC mode. When the write mode is set to the TLC mode, the write data is written into a TLC write destination block 126. The TLC write destination block 126 is the TLC block.

As illustrated in FIGS. 2 and 3, the NAND memory 5 includes an active block pool 104 and a free block pool 116. The memory controller 4 allocates each block BLK of the NAND memory 5 to the active block pool 104 or the free block pool 116. The active block pool 104 includes one or more SLC blocks 106 and one or more TLC blocks 108. The free block pool 116 includes one or more free blocks 118.

After executing the data erase processing on any one of the free blocks 118 allocated to the free block pool 116, the memory controller 4 allocates the block to the SLC write destination block 102 or the TLC write destination block 126.

The memory controller 4 allocates the SLC write destination block 102 or the TLC write destination block 126 to the active block pool 104 when the SLC write destination block 102 or the TLC write destination block 126 has no room to write new data, that is, when the SLC write destination block 102 or the TLC write destination block 126 is filled with the write data.

GC/compaction processing is executed to increase the number of free blocks allocated to the free block pool 116. In the GC/compaction processing, the memory controller 4 sets any one of the SLC blocks 106 and the TLC blocks 108 allocated to the active block pool 104 as a copy source block 112. For example, the memory controller 4 may set a block having a small amount of valid data among the active blocks in which valid data and invalid data are mixed as a copy source block. The memory controller 4 sets any one of the free blocks 118 allocated to the free block pool 116 as a copy destination block 114.

The memory controller 4 copies valid data in the copy source block 112 to the copy destination block 114. The memory controller 4 updates the L2P table 34 to map the physical address of the copy destination block 114 to each LBA of copied valid data in the copy source block 112. The copy source block 112 that contains only invalid data is allocated to the free block as a result of copying valid data to the copy destination block 114.

Since each block can be used as the TLC block or the SLC block, the block allocated to the SLC write destination block 102 does not need to be fixed to a specific block. The copy source block targeted for the GC/compaction processing for generating the free block allocated to the SLC write destination block 102 is not limited to the SLC block, and may be the TLC block. Since the SLC block stores only 33% of data compared to the TLC block and the amount of data to be copied is small, the SLC block is more likely to be selected as the copy source block. However, when the percentage of invalid data is high and the percentage of valid data is low even in the TLC block, the TLC block may be selected as the copy source block. For example, block BLK0 may be allocated to the SLC write destination block 102, may become the SLC active block 106, may become the free block 118 by the GC/compaction processing, and then may be allocated to the TLC write destination block 126. Such a method is referred to as an SLC/TLC switching scheme. In the SLC/TLC switching scheme, the free block pool 116 is common regardless of whether the write mode is the SLC mode or the TLC mode.

Meanwhile, there is also a scheme in which the block allocated to the SLC write destination block 102 is determined to be specific blocks, for example, blocks BLK0 to BLK99. This scheme is referred to as an SLC fixed scheme. In the SLC fixed scheme, a free block pool for an SLC write destination block and a free block pool for a TLC write destination block need to be provided separately. The GC/compaction processing for creating the free block for the SLC write destination block 102 and the GC/compaction processing for creating the free block for the TLC write destination block 126 are separate processing.

The embodiment is applicable to both the SLC/TLC switching scheme and the SLC fixed scheme.

The processing for selecting the SLC block as the copy source block 112 and rewriting data in an SLC block group 122 into the TLC block by GC processing is sometimes referred to as compaction processing, but in this specification, the processing for generating a free block by copying valid data in a copy source block, which is an active block, to a copy destination block and making the copy source block a free block is collectively referred to as GC/compaction processing.

In the NAND memory 5, a set of blocks used as SLC blocks is referred to as the SLC block group 122. The SLC block group 122 includes an SLC block which is originally a TLC block but is a block into which data is temporarily written in the SLC mode. The data written into the SLC block in the SLC block group 122 are rewritten into the TLC block by GC/compaction processing in the TLC mode.

Figure 4A:
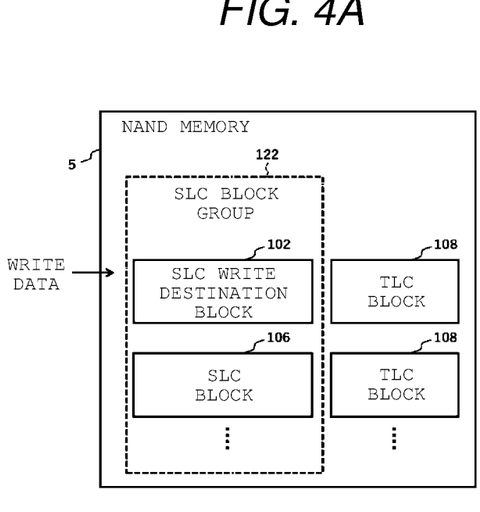
FIGS. 4A and 4B are diagrams illustrating a configuration example of an SLC block group in the NAND flash memory in the memory system according to the embodiment.
Figure 4B:
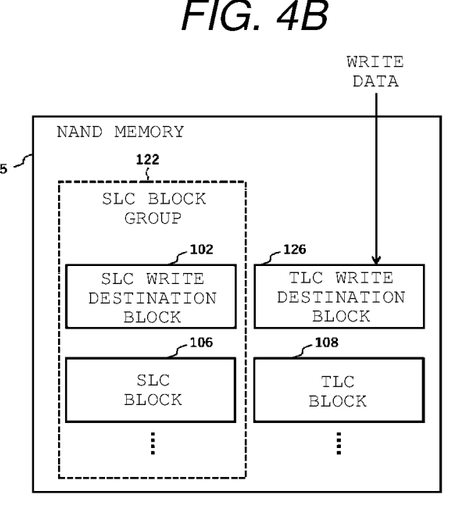

FIGS. 4A and 4B are diagrams illustrating the SLC block group 122. FIG. 4A illustrates an example of the SLC block group 122 when the write mode of the NAND memory 5 is set to the SLC mode. In this case, the SLC block group 122 includes the SLC write destination block 102, which is the write destination block of write data, and the SLC block 106 to which the write data is already written. Blocks other than SLC block group 122 of the NAND memory 5 include the TLC block 108.

FIG. 4B illustrates an example of the SLC block group 122 when the write mode of the NAND memory 5 is set to the TLC mode. In this case, the SLC block group 122 includes the SLC block 106 to which write data is already written. Blocks other than the SLC block group 122 of the NAND memory 5 include the TLC block 108 and the TLC write destination block 126.

As described above, since the storage capacity of the SLC blocks 102 and 106 is one third of the storage capacity of the TLC blocks 126 and 108, the storage capacity of the memory system 3 increases when the number of blocks of the SLC block group 122 decreases.

The transition of the write mode when the memory controller 4 writes data into the NAND memory 5 is described. As described above, in the second write mode, data are read and written slowly, and the number of times data can be written is small. Therefore, when the capacity of the NAND memory 5 is sufficient, the memory controller 4 writes data into the SLC block in the first write mode, this time in the SLC mode as an example.

When the remaining capacity of the NAND memory 5 becomes small, the memory controller 4 performs GC/compaction processing. Specifically, the memory controller 4 writes data written in the first write mode in the second write mode to increase the storage capacity of the memory system 3. In this case, the memory controller 4 refers to the access frequency table 35 and the low frequency access ratio table 36, and preferentially writes data whose access frequency is lower than a certain value in the second write mode.

Although it has been described that the memory controller 4 refers to the access frequency contained in the access frequency table 35 and the low frequency access ratio table 36 to perform GC/compaction processing, what is referred to is not limited to the access frequency.

EMBODIMENT

When the remaining capacity of the NAND memory 5 becomes even smaller, the memory controller 4 performs GC/compaction processing a plurality of times. As a result of this processing, data with a low access frequency is written at least once in the second write mode. More specifically, data with a low access frequency is written into a block with a high storage density of memory cells, such as the TLC block. In contrast, since data with a high access frequency is not subjected to GC/compaction processing, the data remains written in a block with a low storage density of memory cells such as the SLC block.

That is, when a sufficient amount of time elapses since data was written into the NAND memory, the data written into the SLC block is data with a high access frequency, and the data written into the TLC block is data with a low access frequency.

Accordingly, the memory controller 4 according to this embodiment is configured to include a tag management circuit 18. The tag management circuit 18 includes a tag recognition circuit 19 and a tag assigning circuit 20, and is connected to the bus 10. In a case where the memory controller 4 reads data, the tag management circuit 18 assigns a storage state tag to management data of the data. In a case where the memory controller 4 writes data, when the storage state tag is assigned to the management data of the data, the tag management circuit 18 writes the data into the block corresponding to the storage state tag.

The storage state tag is described. The storage state tag is managed by the tag management circuit 18. The tag recognition circuit 19 of the tag management circuit 18 can recognize the storage state tag. When the memory controller 4 writes data into the block, the tag recognition circuit 19 accesses a data buffer and retrieves the storage state tag contained in the management data. The data buffer includes the write buffer 32 and the read buffer 33. When the tag recognition circuit 19 recognizes the storage state tag, the tag recognition circuit 19 transmits a command to which a storage state is assigned to the memory controller 4. The memory controller 4 receives the command and writes the data into the block corresponding to the storage state tag.

In a case where the memory controller 4 reads data from the NAND memory to the data buffer, when the tag management circuit 18 recognizes that the storage state tag is not assigned to the data read, the tag management circuit 18 assigns a storage state tag to the management data corresponding to the data. For example, in a case where the memory controller 4 reads data from the SLC block, when the tag recognition circuit 19 recognizes that the storage state tag is not assigned to the data read into the data buffer, the tag assigning circuit 20 assigns an SLC tag to management data of the read data. Similarly, in a case where the memory controller 4 reads data from the MLC, TLC, and QLC blocks, when the tag recognition circuit 19 recognizes that the storage state tag is not assigned to the data read into the data buffer, the tag assigning circuit 20 assigns a corresponding storage state tag to the management data of the read data.

The tag management circuit 18 may be implemented by hardware or may be implemented as a processor programmed with firmware. The tag management circuit 18 is configured with a functional part for recognizing the tag and a functional part for assigning the tag, but these two functions may be implemented as one circuit, or may be implemented as two different circuits.

Figure 5:
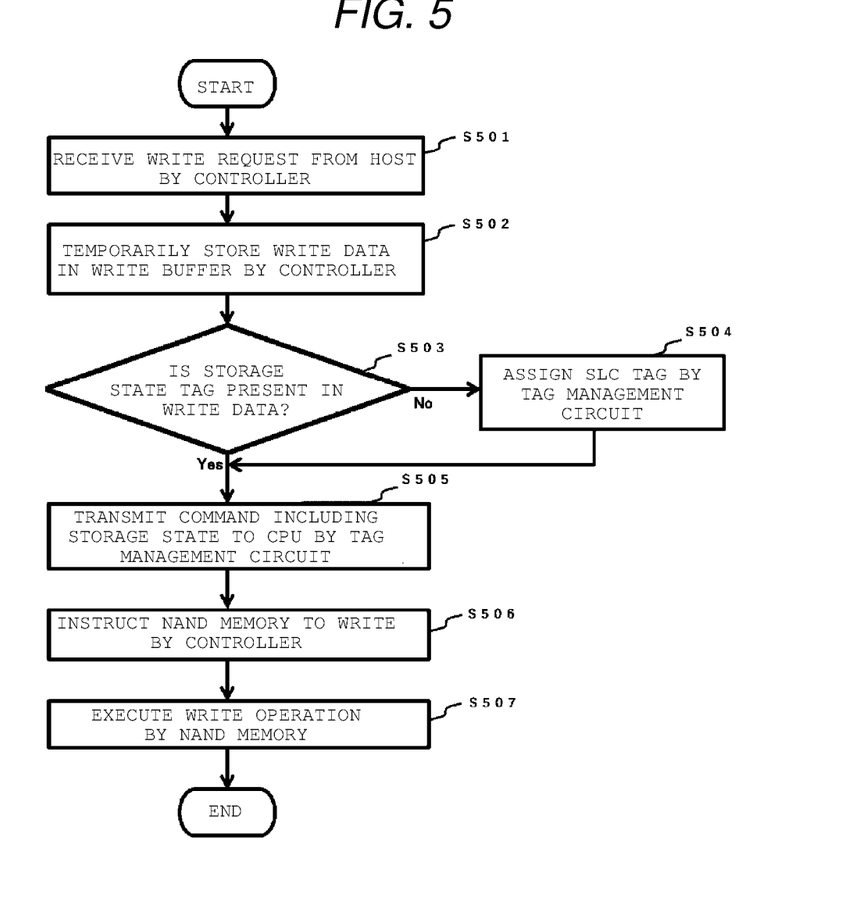
FIG. 5 is a flowchart illustrating an example of an operation of a memory controller when writing data, in the memory system according to the embodiment.

An overview of the operation of the memory controller 4 when writing data to the NAND memory 5 in the memory system according to this embodiment will be described. FIG. 5 illustrates an operation flow of the memory controller 4.

The memory controller 4 receives a write request designating a logical address from the host (step S501). The memory controller 4 temporarily stores write data in the write buffer 32 (step S502). The tag management circuit 18 receives a command to refer to write data in the write buffer 32 from the memory controller 4, and checks whether a storage state tag is present in the write data (step S503). When the storage state tag cannot be recognized in the write data, the tag management circuit 18 assigns an SLC tag to the write data (step S504). The tag management circuit 18 transmits a command assigned with a storage state to the CPU 12 of the memory controller 4 (step S505).

The memory controller 4 assigns the received logical address to a physical address of an unused page in the user area of the NAND memory 5. The memory controller 4 issues a write command that the NAND memory 5 can recognize. This write command includes an instruction to write to a block in a storage state corresponding to the storage state tag of data. The ECC processing circuit 17 adds parity to the received write data. Then, the write command, the physical address, and the write data to which the parity is added are transmitted to the NAND memory 5 as a write instruction (step S506). When receiving the write instruction, the NAND memory 5 executes the write operation (step S507).

Through the series of steps described above, the memory controller 4 writes data into the NAND memory 5 in the storage state designated by the storage state tag assigned to the write data.

When data to which the storage state tag is not assigned is written into the memory system 3 as it is, the memory controller 4 first writes the data to a block having a low storage density. After that, the memory controller 4 writes data with a low access frequency into the block having a high storage density according to the remaining capacity of the NAND memory 5. In this case, the memory controller 4 needs to perform the GC/compaction processing a plurality of times.

Meanwhile, when the storage state tag is assigned to data, the memory controller 4 can directly write the data to the block in a storage state corresponding to the storage state tag when writing the data to which the storage state tag is assigned. That is, when the storage state tag of the block having a high storage density is assigned to data with a low access frequency before writing the data to the memory cells, the data can be directly written into the block with a high storage density of the memory cells. Therefore, the number of times of GC/compaction processing can be reduced and the lifetime of the memory cell can be extended as compared with the method in which the storage state tag is not assigned.

Figure 6:
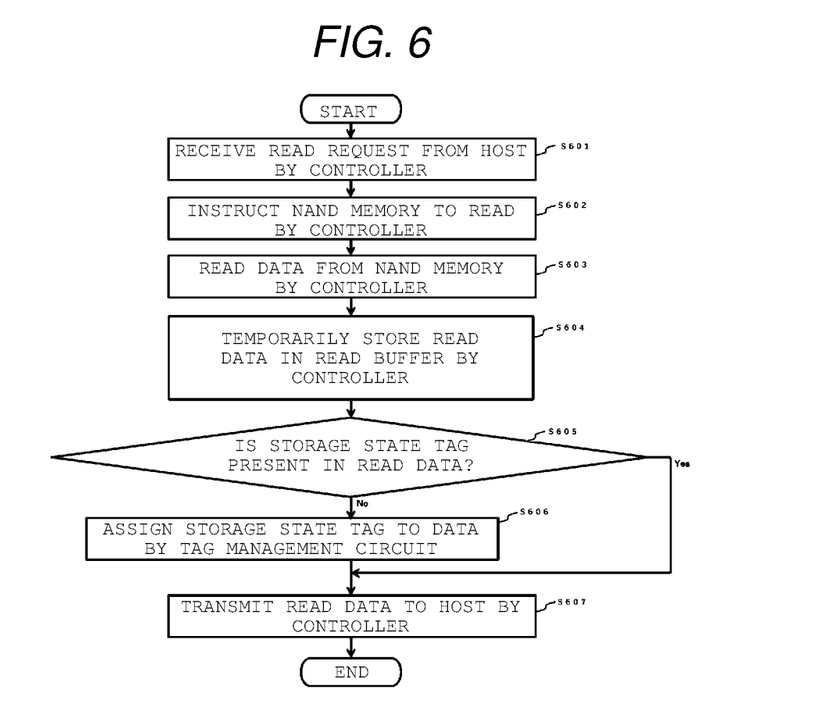
FIG. 6 is a flowchart illustrating an example of an operation of the memory controller when reading data, in the memory system according to the embodiment.

Next, an overview of the operation of the memory controller 4 when reading data stored in the NAND memory 5 in the memory system according to this embodiment will be described. FIG. 6 is a flowchart illustrating an example of the operation flow of the memory controller 4.

The memory controller 4 receives a read request designating a logical address from the host (step S601). When receiving the read request designating the logical address via the host I/F 11, the memory controller 4 uses the L2P table 34 to convert the logical address designated in the read request into a physical address. The memory controller 4 instructs the NAND memory 5 to read data from the converted physical address (step S602).

The memory controller 4 reads data from the NAND memory 5 via the NAND I/F 13 (step S603). The memory controller 4 temporarily stores the read data in the read buffer 33 (step S604).

The memory controller 4 transmits a command to refer to the read data in the read buffer 33 to the tag management circuit 18 (step S605). When the storage state tag cannot be checked in the read data, the tag management circuit 18 assigns the storage state tag corresponding to the stored state to the management data in the read data (step S606). For example, if the stored state of the read data is SLC, the SLC tag is assigned, and if the stored state of the read data is TLC, the TLC tag is assigned.

The memory controller 4 transmits the read data to the host 2 via the host I/F 11 (step S607).

Through the series of steps described above, the memory controller 4 can assign the storage state tag to data when reading the data. Therefore, according to this embodiment, when writing the read data again, the memory controller 4 can write the data to an appropriate memory cell based on the storage state tag assigned to the read data.

Figure 7:
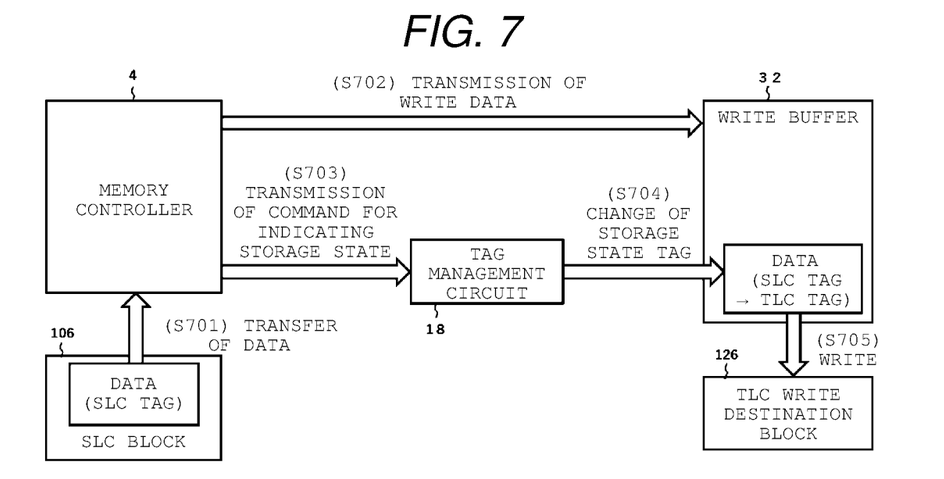
FIG. 7 is a block diagram illustrating an example of an operation of the memory controller, in the memory system according to the embodiment.

The block diagram of FIG. 7 illustrates processing when the storage state of data to which the storage state tag is assigned is changed by the GC/compaction processing, for example, when data, which exists in the SLC block and to which the SLC tag is assigned, is rewritten into the TLC block.

The memory controller 4 sends data existing in the SLC block to the write buffer as write data (steps S701 and S702). The memory controller 4 transmits a command indicating that the storage state of the write destination block is TLC to the tag management circuit 18 (step S703). The tag management circuit 18 refers to the write data in the write buffer and changes the storage state tag from the SLC tag to the TLC tag (step S704). After that, the memory controller 4 writes the write data to the TLC block (step S705).

By performing the operations described above, when writing data in which the SLC tag is assigned to the TLC block, the memory controller 4 can change the storage state tag from the SLC tag to the TLC tag and write the data to the TLC block. By performing similar processing, the memory controller 4 can always match the storage state of data in the NAND memory 5 with the storage state tag.

Figure 8:
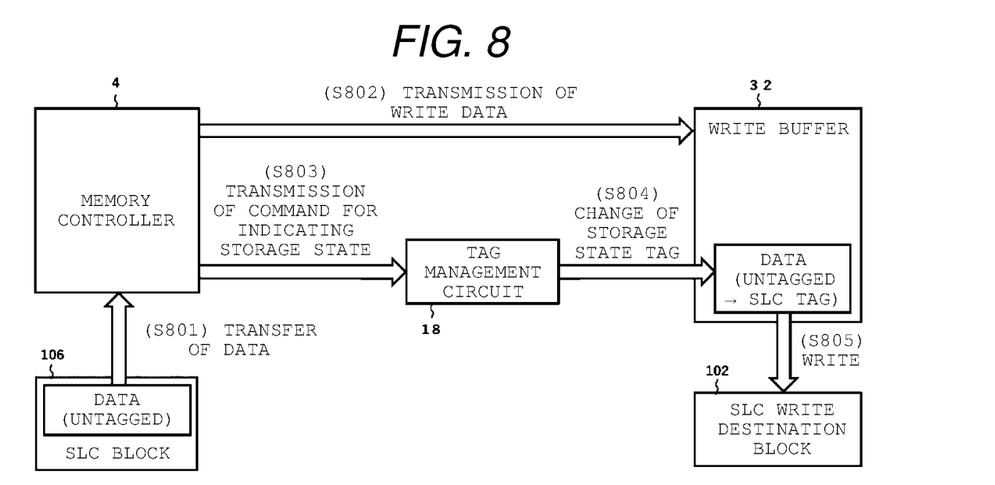
FIG. 8 is a block diagram illustrating another example of the operation of the memory controller, in the memory system according to the embodiment.

The block diagram of FIG. 8 illustrates the operation when data to which the storage state tag is not assigned is rewritten into another block by GC/compaction processing. For example, GC/compaction processing when rewriting data, which exists in the SLC block and to which the storage state tag is not assigned, to another SLC block is described.

The memory controller 4 sends the data which exists in the SLC block to the write buffer as write data (steps S801 and S802). The memory controller 4 transmits a command indicating that the storage state of the write destination block is SLC to the tag management circuit 18 (step S803). The tag management circuit 18 refers to the write data in the write buffer and assigns the SLC tag to the management data (step S804). After that, the memory controller 4 writes the write data to the SLC block (step S805).

By performing the operations described above, the memory controller 4 can assign a storage state tag to data which exists in the NAND memory 5 and to which the storage state tag is not assigned.

It goes without saying that the disclosure is not limited to the embodiment described above, and various modifications can be made thereto without departing from the scope of the present disclosure.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system that is connectable to a host, the memory system comprising:
    a nonvolatile memory including a plurality of memory cells;
    a data buffer connected to the nonvolatile memory; and
    a memory controller configured to control the nonvolatile memory, the memory controller including a tag recognition circuit configured to recognize whether a storage state tag is assigned to first data in the data buffer, and a tag assigning circuit, wherein:
    the first data is write data to be written into the nonvolatile memory and the storage state tag indicates a mode of writing the first data in the memory cells;
    when the tag recognition circuit recognizes that the storage state tag is assigned to the write data, the tag recognition circuit transmits a first command in accordance with the storage state tag to the memory controller;
    when the tag recognition circuit does not recognize that the storage state tag is assigned to the write data, the tag assigning circuit assigns the storage state tag to the write data; and
    when the memory controller receives the first command, the memory controller performs control to write the write data to the memory cells in accordance with a mode indicated by the storage state tag.

2. The memory system according to claim 1, wherein modes of writing the write data in the memory cells include a first write mode according to which n1 bit(s) are stored per memory cell and a second write mode according to which n2 bits are stored per memory cell, where n2>n1.

3. The memory system according to claim 1, wherein when a write request is made, the memory controller sends a command to access the data buffer to the tag recognition circuit.

4. The memory system according to claim 1, wherein the tag assigning circuit adds the first-storage state tag to management data of the write data.

5. The memory system according to claim 1, wherein when a read request is made to read second data from the nonvolatile memory, the memory controller sends a command to access the data buffer to the tag recognition circuit.

6. The memory system according to claim 5, wherein the tag assigning circuit assigns the storage state tag to the second data when the tag recognition circuit does not recognize that the storage state tag is assigned to the second data.

7. The memory system according to claim 6, wherein the storage state tag assigned to the second data indicates the mode by which the first second data was stored in the memory cells.

8. An information processing system comprising:
a memory system including a nonvolatile memory including a plurality of memory cells, a data buffer connected to the nonvolatile memory, and a memory controller configured to control the nonvolatile memory, the memory controller including a tag recognition circuit and a tag assigning circuit; and
a host connected to the memory system, wherein
the tag recognition circuit is configured to check whether a storage state tag is assigned to first data in the data buffer,
when the tag recognition circuit recognizes that the storage state tag is assigned to the first data, the memory controller performs control to write the first data to the memory cells in accordance with a mode indicated by the storage state tag, or performs control to transmit the first data to the host, and
when the tag recognition circuit does not recognize that the storage state tag is assigned to the first data, the tag assigning circuit assigns a storage state tag to the first data.

9. The information processing system according to claim 8, wherein
when the first data is read data read from the nonvolatile memory and the tag recognition circuit does not recognize that the storage state tag is assigned to the first data, the tag assigning circuit assigns the storage state tag which indicates the mode by which the read data was stored in the memory cells.

10. The information processing system according to claim 8, wherein
the storage state tag is one of a first storage state tag, which indicates a first mode of writing data in the memory cells, and a second storage state tag, which indicates a second mode of writing data in the memory cells.

11. The information processing system according to claim 10, wherein n1 bit(s) are stored per memory cell in the first mode of writing and n2 bits are stored per memory cell in the second mode of writing, where n2>n1.

12. The information processing system according to claim 11, wherein
when the first data is write data and the tag recognition circuit does not recognize that the storage state tag is assigned to the write data, the tag assigning circuit assigns the first storage state tag to the write data.

13. The information processing system according to claim 8, wherein the tag assigning circuit adds the storage state tag to management data of the first data.

14. A method of writing data to a nonvolatile memory including a plurality of memory cells, said method comprising:
reading data from a first block of the memory cells and storing the data in a write buffer;
assigning a storage state tag to the data stored in the write buffer; and
writing the data stored in the write buffer in a second block of the memory cells according to a mode of writing indicated by the storage state tag, wherein:
the storage state tag is one of a first storage state tag, which indicates a first mode of writing data in the memory cells, and a second storage state tag, which indicates a second mode of writing data in the memory cells;
n1 bit(s) are stored per memory cell in the first mode of writing and n2 bits are stored per memory cell in the second mode of writing, where n2>n1; and
if no storage state tag was assigned to the data, the first storage state tag is assigned to the data when read from the first block of the memory cells and stored in the write buffer.

15. The method according to claim 14, wherein if the first storage state tag was assigned to the data, the second storage state tag is assigned to the data when read from the first block of the memory cells and stored in the write buffer.

* * * * *